Patented May 20, 1952

2,597,708

UNITED STATES PATENT OFFICE 2,597,708

ANTISTATIC AGENT, TREATMENT OF SHAPED ARTICLES THEREWITH, AND TREATED ARTICLES

Arthur Cresswell, Stamford, Conn., assignor to American Cyanamid Company, New York, N. Y., a corporation of Maine No Drawing. Application December 30, 1948, Serial No. 68,372

14 Claims. (Cl. 252—8.75)

This invention relates to a new and useful anti-static agent, to the treatment of shaped articles, more particularly such articles comprising one or more vinyl resins, with the new anti-static agent and to the treated articles. The present invention especially is concerned with an anti-static agent comprising a guanidine salt of a mono-aliphatic hydrocarbon ester of sulfuric acid, the aliphatic hydrocarbon grouping of which contains from 12 to 18 carbon atoms, inclusive, and with a method of conditioning a shaped article (e. g., in the form of a fiber, film, etc.) of a thermoplastic vinyl resin to lessen its tendency to accumulate static charges of electricity thereon, as well as with the products resulting from this treatment. The treatment is effected by applying to the shaped article, which in a dry state normally has a tendency to accumulate static charges of electricity thereon, a guanidine salt of a mono-aliphatic hydrocarbon (specifically mono-alkyl) ester of sulfuric acid, the aliphatic hydrocarbon (specifically alkyl) grouping of which contains from 12 to 18 carbon atoms, inclusive, e. g., guanidine dodecyl hydrogen sulfate, guanidine dodecenyl hydrogen sulfate, guanidine octadecyl hydrogen sulfate, guanidine oleyl hydrogen sulfate, etc. It is applicable to the treatment of filaments, fibers, yarns, films, woven, knitted and felted fabrics, and other articles made from or containing one or more thermoplastic vinyl resins for the purpose of eliminating substantially completely (in some cases) or materially lessening or retarding (in all other cases) the tendency of such articles to accumulate charges of static electricity thereon either during the production of the article, or in connection with subsequent finishing operations, or during the use of the article.

Vinyl resins constitute a class of materials which develop or tend to develop an electrostatic charge upon their surfaces when fibers or other articles made therefrom are subjected to friction during their production and during processing or fabrication of the fibers into fabrics or other articles, as well as during the use of the finished article. Various treatments have been tried or suggested in an effort to prevent or reduce the accumulation of an electrostatic charge on the surfaces of shaped articles made from vinyl resins, but to the best of my knowledge and belief none has been entirely satisfactory. For example, it was suggested prior to my invention that vinyl resins, more particularly those which contain a substantial percentage of vinyl halide combined in the molecules, be treated with a water-dispersible compound having a polyalkylene polyamine nucleus, which nucleus has an average molecular weight of at least 300, or with a water-dispersible polyethylene imine having an average molecular weight of at least 300, in order to prevent or retard the accumulation of charges of static electricity upon the surfaces of filaments, fibers, yarns and various fabrics and other articles made from or containing such resins. Such compounds are relatively expensive and do not completely meet the requirements of the trade.

The present invention is based on my discovery that guanidine salts of a mono-aliphatic hydrocarbon ester of sulfuric acid, more particularly such salts wherein the aliphatic hydrocarbon grouping contains from 12 to 18 carbon atoms, inclusive, have the particular and peculiar property of functioning as anti-static agents. The invention is based on my further discovery that filaments, fibers, yarns, films and other shaped articles composed of or containing a vinyl resin, more particularly a thermoplastic vinyl resin, e. g., polyacrylonitrile, copolymers of acrylonitrile and a different vinyl compound such, for instance, as vinyl chloride, copolymers of vinyl acetate and vinyl chloride, etc., can be conditioned so as to obviate or minimize their tendency to accumulate static charges of electricity thereon by treating them with one or more of the aforementioned salts, alone or in conjunction with a conventional textile lubricant, e. g., an alkyl ester of a long-chain fatty acid, a wetting and/or dispersing agent, a detergent, etc., as briefly described in the first paragraph of this specification and more fully hereafter. These results, for which I have no theoretical explanation and which were wholly unobvious and unpredictable, are obtained without detrimentally affecting the color, tensile strength, elasticity, flexibility, chemical resistance, bacterial and fungal resistance, and other valuable properties of the vinyl resin, or without rendering the vinyl resin article in any way unsuited for its intended purpose.

The guanidine salts of mono-aliphatic esters which are used in carrying my invention into effect may be represented by the formula I 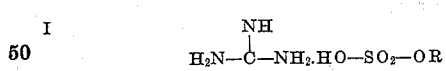

where R represents an aliphatic hydrocarbon radical, more particularly such a radical which contains at least 12 carbon atoms and, advantageously, not more than 18 carbon atoms. Illustrative examples of radicals which R in the above formula may represent are dodecyl, tetradecyl, hexadecyl (cetyl), octadecyl, dodecenyl, tetradecenyl, hexadecenyl, octadecenyl (including oleyl), etc. These guanidine salts may be produced by any suitable method now known to those skilled in the art for the preparation of similar compounds. For example, they may be prepared by a two-stage operation which involves first forming the mono-ester of sulfuric acid by effecting reaction between a primary or secondary monohydric alcohol corresponding to the ester desired and concentrated sulfuric acid in accordance with the following general equation:

II $\qquad ROH + H_2SO_4 \rightarrow RHSO_4 + H_2O$

The second step of the process consists in neutralizing the mono ester with a suitable guanidine compound, e. g., guanidine carbonate. This step may be illustrated by the following equation:

III
[H_2NC(:NH)NH_2]_2.H_2CO_3 + 2RHSO_4 →
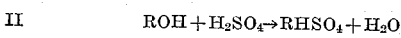
$2H_2NC(:NH)NH_2.HSO_4.R + CO_2 + H_2O$ In the foregoing equations R has the same meaning as given above with reference to Formula I.

A specific example of the preparation of a guanidine salt of the kind embraced by Formula I is as follows: Eighty-one (81) grams of octadecyl alcohol, $CH_3(CH_2)_{16}CH_2OH$, is mixed with 29.4 grams of concentrated sulfuric acid containing approximately 93% $H_2SO_4$, and then heated to 60° C. to complete the reaction. Thereafter 27 grams of guanidine carbonate is slowly stirred in, and the mixture is kept warm until foaming has stopped. The resulting crude guanidine salt is ground, washed thoroughly with about 2 liters of warm (45° C.) acetone, filtered and dried.

Illustrative examples of vinyl resins to which the anti-static agents employed in practicing the present invention are applicable include vinyl resins produced by the conjoint polymerization of a vinyl halide, e. g., vinyl chloride, with a vinyl ester of an aliphatic acid, e. g., vinyl acetate. Such resins are more fully described in, for example, Rugeley et al. Patent No. 2,161,766, and generally contain about 50% to about 95% by weight of combined vinyl halide in the copolymer, the remainder being a vinyl ester of an aliphatic acid. Examples of other vinyl resins to which the present invention is applicable include those formed by the conjoint polymerization of a vinyl halide, e. g., vinyl chloride, with a nitrile of an unsaturated acid, e. g., acrylonitrile, methacrylonitrile, etc.; polyvinyl chloride and other polyvinyl halides, as well as resins produced by the halogenation (e. g., chlorination) of such polyvinyl compounds; resins produced by the chlorination of copolymers of a vinyl halide with a vinyl ester of an aliphatic acid; resins produced by the conjoint polymerization of vinyl chloride or other vinyl halide with an N-alkylated imide derivative of an aliphatic acid, e. g., N-butyl maleimide; and resins produced by the conjoint polymerization of a vinyl halide, a vinyl ester of an aliphatic acid and maleic acid.

The preferred thermoplastic vinyl resins which are subjected to treatment in accordance with my invention are those in which the vinyl resin contains a substantial amount of acrylonitrile, more particularly polyacrylonitrile and thermoplastic copolymers of acrylonitrile such as those obtained by polymerizing a mixture of monomers comprising mainly, that is, a preponderant proportion by weight of acrylonitrile, and preferably those in which the acrylonitrile constitutes at least about 85% by weight of the mixture of monomers. From the foregoing it will be seen that in some cases the acrylonitrile may constitute, for example, from about 55% to about 99.5% by weight of the mixture of monomers.

Illustrative examples of monomers which may be copolymerized with acrylonitrile to yield a thermoplastic polymerization product (copolymer or interpolymer) which may be subjected to an anti-static treatment as herein described are compounds containing a single

grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single

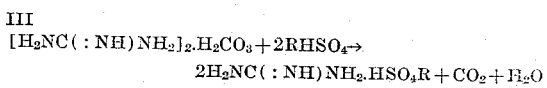

grouping, e. g., isobutylene, etc.; and numerous other vinyl, acrylic and other compounds containing a single

grouping which are copolymerizable with acrylonitrile to yield thermoplastic copolymers. Alkyl esters of alpha, beta-unsaturated polycarboxylic acids also may be copolymerized with acrylonitrile to form copolymers which may be treated in accordance with the present invention, e. g., the dimethyl, -ethyl, -propyl, -butyl, etc., esters of maleic, fumaric, citraconic, etc., acids.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. U. S. Patent No. 2,160,054. The polymeric and copolymeric acrylonitriles which are subjected to treatment may be of any suitable molecular weight, but ordinarily the molecular weight (average molecular weight) is within the range of 15,000 to 300,000 or higher, and advantageously is of the order of 35,000 or 40,000 to 140,000 or 150,000, as calculated from viscosity measurements using the Staudinger equation (reference: U. S. Patent No. 2,404,713).

The guanidine salt may be applied to the thermoplastic vinyl resin by any suitable means, but preferably it is applied in the form of a liquid dispersion, more particularly an aqueous dispersion. This dispersion may contain any suitable amount of guanidine salt, but ordinarily the salt is present in the dispersion in an amount corresponding to from about 0.5% to about 5% by weight thereof. The dispersion may be applied, for example, by immersing the fiber or other shaped article formed of or containing the vinyl resin in the dispersion, or by spraying, padding, brushing or otherwise contacting the shaped article with the dispersion. In applying the dispersion, it is preferably heated to an elevated temperature, e. g., from about 45° or 50° C. to about 95° C., or in some cases even as high as 100° C. The dispersion may be applied at room temperature (20–30° C.) or at temperatures up to 45° C., but the lower temperatures are usually less desirable because of the somewhat greater difficulty in maintaining the guanidine salt homogeneously dispersed in water or other liquid dispersion medium at the lower temperatures. Upon drying the fiber or other shaped article at room temperature or at an elevated temperature, e. g., on heated drying rolls, the treated article has the aforementioned guanidine salt deposited at least on the outer surfaces thereof. The amount of guanidine salt which is present in or on the dried, treated article may vary considerably, but ordinarily it is present therein or thereon in an amount, by weight, corresponding to from about 0.2% to about 4% of the dried, untreated article.

It is not essential that the guanidine salt be used as the sole anti-static agent or effect agent which is present in the aqueous dispersion. In some cases, however, it is advantageous to use the guanidine salt alone, since, because of the long-chain aliphatic hydrocarbon grouping, specifically alkyl grouping, which is present therein, it is capable of functioning both as a lubricating agent and as an anti-static agent. In other cases it may be desirable to use the guanidine salt in conjunction with a conventional textile lubricant and/or other conditioning agent or agents which are commonly employed in finishing compositions used, for example, in treating thermoplastic vinyl resins in fiber, film or other form. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in combination with the guanidine salt are wetting and dispersing agents of various kinds, for example, N-octadecyl disodium sulfosuccinamate, dioctyl sodium sulfosuccinate, etc., lecithin, esters of long-chain fatty acids, advantageously esters of fatty acids which contain from 12 to 18 carbon atoms, inclusive, e. g., alkyl stearates, palmitates and oleates, more particularly the ethyl, propyl, butyl and amyl stearates, palmitates and oleates. As is well known to those skilled in the art, mineral, vegetable and animal oils as well as esters of long-chain fatty acids are lubricants for textiles.

The finishing compositions containing an anti-static agent comprising a guanidine salt of the kind embraced by Formula I may be applied to the shaped thermoplastic vinyl resin, for example yarns of associated filaments of such a resin, in the course of the production of the yarn or other shaped article, or subsequent to the production of the yarn and before or after any textile operations in which such yarns are used, especially those operations which include or involve a winding operation. By applying the finishing composition in the course of producing the filaments or fibers, the application may suffice for subsequent textile operations. If desired, however, the textile-treating agent containing the described anti-static agent may be applied both during the process of producing the yarns as well as later when these yarns are fabricated into textile fabrics.

The guanidine salt used in practicing my invention also may be applied to thermoplastic vinyl resins when the latter are in gelled form. For example, I may apply a liquid treating agent to a fiber in gel state, more particularly an aquagel state, and in which the solid phase comprises an acrylonitrile polymerization product, more particularly such a product which contains in the molecules thereof an average of at least about 85% by weight of combined acrylonitrile, which treating agent comprises an aqueous dispersion containing a guanidine salt of the kind embraced by Formula I. Thereafter the thusly treated, gelled fiber is dried, for example by continuously passing the fiber over heated drying rolls as is described more fully in my copending application Serial No. 68,370, filed concurrently herewith, and which was abandoned in favor of my copending application Serial No. 73,078, filed January 27, 1949, now Patent No. 2,558,731, dated July 3, 1951. In this way the guanidine salt imparts anti-static characteristics to the fiber both during and after drying thereof.

The guanidine salts used in practicing the present invention are especially suitable for use in the treatment of water-swollen, oriented or unoriented fibers, films, etc., which have been produced as described, for example, in my copending application Serial No. 772,200 filed September 4, 1947, now Patent No. 2,558,730, dated July 3, 1951, and in my aforementioned copending application Serial No. 68,370, as well as in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the guanidine salt or a finishing composition or textile-treating agent containing the same to the thermoplastic vinyl resin in fiber, film or other form, and it may be applied at any suitable stage of the production of the shaped article, or during its fabrication into other forms, or to the finished, fabricated article and prior to or during its service use. For example, if the conditioning agent is to be applied to the yarn after spinning, the yarn may be brought into contact with a wick, roll or felt which has been wetted with an aqueous or other dispersion or emulsion containing the guanidine salt. Alternatively, the liquid finishing composition containing the guanidine salt may be applied to the vinyl resin article by immersing the article in a bath containing the same, or by spraying, brushing, coating or otherwise applying the finishing composition to the article. Examples of points during the production of a yarn at which the conditioning agent may be applied are during stretching of a wet spun yarn or fiber to orient the molecules thereof, or between any of the guides or godets or other rolls employed in the spinning process, or between the guide and the point of winding and/or twisting; or, the conditioning agent may be applied to the yarn after winding onto cones, spools, bobbins or the like; or, in the case of staple fiber manufacture, the conditioning agent may be applied to the yarn either prior to or after cutting the yarn into staple lengths.

If desired, the guanidine salt which is deposited in or on the treated article may be allowed to remain in place during and after the production of the article in its ultimate form. Generally, however, the applied conditioning agent comprising the guanidine salt is removed either prior to dyeing or, if it has been applied to the dyed article, prior to the sale of the article to the trade. The conditioning agent may be removed, if desired, from yarns, fabrics and the like containing the same by means of the usual aqueous scouring baths.

In order that those skilled in the art better may understand how the present invention can be carried into effect, the following examples are given by way of illustration and not by way of limitation. All parts and percentages are by weight.

Example 1

A swatch of thread spun from a copolymer of 90% acrylonitrile and 10% acrylamide as described in my copending application Serial No. 772,200 filed September 4, 1947, was used in this example. The swatch had been air dried, and picked up static electricity very readily when stroked with the hand or with a piece of cellulose acetate in strip form.

The swatch of copolymer thread was immersed for about 1 or 2 minutes in an aqueous dispersion containing 2% of guanidine octadecyl hydrogen sulfate and 1% of N-octadecyl disodium sulfosuccinamate, which latter was used to facilitate the dispersion of the guanidine octadecyl hydrogen sulfate. The dispersion was maintained at 40-50° C. during the treatment. The swatch was dried first at room temperature and then in a 60° C. oven for about 30 minutes. After drying, the swatch felt smoother and softer than it did before the treatment and, when stroked either with the hand or with a piece of cellulose acetate in strip form, failed to develop static electricity.

Similar results are obtained when the above dispersion is applied to a copolymer of 90% acrylonitrile and 10% acrylamide in the form of a film.

Example 2

A swatch of thread spun from a copolymer of 95% acrylonitrile and 5% methyl acrylate as described in my aforementioned copending application Serial No. 772,200 was used in this example. The swatch had been air dried and, as in the case of the copolymer of Example 1, picked up static electricity very readily when stroked with the hand or with a piece of cellulose acetate in strip form.

A textile-treating agent was prepared by heating to about 70-80° C., with stirring, the following ingredients in approximately the specified proportions:

| | Parts |
|---|---|
| Guanidine octadecyl hydrogen sulfate | 2.0 |
| Textile lubricant, specifically butyl stearate | 1.0 |
| Dispersing agent, specifically N-octadecyl disodium sulfosuccinamate | 0.5 |
| Water | 96.5 |

The swatch of copolymer thread was soaked for about 1 to 2 minutes in this dispersion, after it had cooled to about 40-50° C., after which it was dried first at room temperature and then in a 60° C. oven for about 30 minutes. As in the case of the treated swatch of Example 1, the treated swatch of this example likewise felt smoother and softer than it did before the treatment and, when stroked either with the hand or with a piece of cellulose acetate in strip form, failed to show the accumulation of any electrostatic charge.

Example 3

The following fibres produced from other thermoplastic vinyl resins were used in this example:
1. Orlon (a polyacrylonitrile fiber).
2. Vinyon (made from a high-molecular-weight copolymer of about 88-90% vinyl chloride and about 12-10% vinyl acetate).
3. Vinyon N (made from a copolymer of about 60% vinyl chloride and about 40% acrylonitrile).

Swatches of the above fibers were each treated ("boiled off") in an aqueous solution heated to a temperature of about 60° C. and containing about 1% of N-octadecyl disodium sulfosuccinamate in order to remove any finish that may have been present on the fibers. The swatches were then thoroughly washed in water and dried first at room temperature and then in a 60° C. oven for about 30 minutes. The dry swatches became readily charged with static electricity when stroked with the hand.

Each of the dry swatches was immersed in an aqueous dispersion containing 2% of guanidine octadecyl hydrogen sulfate and 1% of butyl stearate. The swatches were worked for a few minutes in the dispersion, which was at a temperature of about 40-50° C., after which they were dried first at room temperature and then in an oven maintained at a temperature of about 60° C. for about 30 minutes. The dry, treated swatches did not develop any electrostatic charge when stroked either with the hand or with a piece of cellulose acetate in strip form. The treated specimens exhibited no changes in color or any other material changes in properties from those exhibited by the dry, "boiled off" swatches, with the exception that they had a softer feeling to the touch and would not develop a static charge.

Example 4

A sample of polyacrylonitrile having an average molecular weight of about 141,000 was dissolved in a 53% aqueous, neutral solution of calcium thiocyanate at about 45° C. under an atmosphere of carbon dioxide in the proportion of about 7 parts of polymer to about 93 parts of calcium thiocyanate solution. The solution of polyacrylonitrile was spun by extruding it at about 70-80° C. through a 40-hole spinneret having hole diameters of 110 microns into a spinning bath consisting of water at 1-2° C. The coagulated fiber was carried back and forth through the bath by means of a power-driven, submerged godet placed at one end of the bath and a set of free-running rollers at the other end. The total bath travel of the fiber was about 144 inches. On leaving the bath the yarn was subjected, during its travel, to a stretch of about 600% in a hot water bath maintained at 98-99° C., and was finally collected on a bobbin rotating in a water spray to keep the yarn in gel state. A spool of the yarn in gel state was suspended in an aqueous dispersion containing 1% of guanidine octadecyl hydrogen sulfate and 0.5% of butyl stearate. The dispersion was maintained at 40-50° C. during the treatment. The treated yarn was continuously passed over heated, converging, drying rolls as is more fully described in my aforementioned copending application Serial No. 68,370. The dried yarn was immediately twisted and collected on a bobbin. The amount of "finish" on the treated yarn was found to be 0.92% by weight of the dried, untreated yarn. The denier of the finished yarn was 115, and it had a dry tensile strength of 4.5 grams per denier, a wet tensile strength of 3.6 grams per denier, and dry and wet elongations of 14%.

Yarn which was treated as above described with the aqueous dispersion containing guanidine octadecyl hydrogen sulfate was found to run cleaner on the drying rolls than the same gel yarn which had not been treated with an anti-static agent. Furthermore, the dried yarn was easier to handle, since the treatment eliminated filament ballooning caused by the building up of electrostatic charges on the filaments during the processing.

Similar results are obtained when the above-described dispersion containing guanidine octadecyl hydrogen sulfate is applied to a water-swollen or gelled film of polyacrylonitrile, and the treated film in gel state is then dried.

Example 5

The same procedure was followed and the same polyacrylonitrile was used as described in Example 4 with the exception that a different treating composition was applied to the wet, gel fiber. More particularly the treating composition was as follows:

|  | Parts |
|---|---|
| N-octadecyl disodium sulfosuccinamate | 20 |
| Butyl stearate | 10 |
| Guanidine octadecyl hydrogen sulfate | 40 |
| Water | 1940 |

Similar results were obtained.

Example 6

In this example swatches of thread spun from a copolymer of 95% acrylonitrile and 5% methyl acrylate were treated. The threads of one swatch were in water-swollen, gel state and had been spun as described in my aforementioned copending application Serial No. 772,200. The other swatch was made from the same copolymer threads in dried state, in which state they accumulated a charge of static electricity when stroked either by hand or with a strip of cellulose acetate.

An aqueous dispersion was prepared by dispersing 2 parts of guanidine octadecyl hydrogen sulfate in 198 parts of water and heating to about 80° C. The dispersion was cooled to 40–50° C. for use.

Each of the above swatches, one in a gel state and the other in a dry state, was worked in the above dispersion for about 1 to 2 minutes, allowed to drain and then shaken free of excess dispersion. Both swatches were dried by heating in a 60° C. oven for 1 hour.

An electrostatic charge could not be developed on either of the dried, treated swatches when stroked with the hand or with a strip of cellulose acetate.

It will be understood, of course, by those skilled in the art that my invention is not limited to the particular guanidine salts, the particular vinyl resins or the particular conditions of applying the former to the latter as given in the above illustrative examples. For instance, in place of guanidine octadecyl hydrogen sulfate, any of the other guanidine salts (or mixtures of said salts) of the kind embraced by Formula I may be employed, e. g., guanidine oleyl hydrogen sulfate, guanidine dodecenyl hydrogen sulfate, guanidine tetradecyl hydrogen sulfate, guanidine tetradecenyl hydrogen sulfate, guanidine hexadecyl hydrogen sulfate, guanidine hexadecenyl hydrogen sulfate, etc., or mixtures thereof in any proportions. Guanidine salts of mono-aliphatic hydrocarbon esters of sulfuric acid, wherein the aliphatic hydrocarbon grouping contains less than 12 carbon atoms, e. g., from 1 to 11 carbon atoms, inclusive, also have the characteristic property of imparting anti-static characteristics to thermoplastic vinyl resins, but in general their use is less desirable because, as a result of the shorter chain length of the aliphatic hydrocarbon grouping, they have less lubricating and softening effect upon the vinyl resin article. Guanidine salts of mono-aliphatic hydrocarbon esters of sulfuric acid, wherein the aliphatic hydrocarbon grouping contains more than 18 carbon atoms, e. g., from 20 to 32 or more carbon atoms, also would be expected to have the same characteristic property of imparting anti-static characteristics to thermoplastic vinyl resins, but such salts are more costly to produce because of the higher alcohol required for their manufacture and the lesser availability and greater cost of such higher alcohols.

Likewise it will be understood by those skilled in the art that the invention is not limited to the treatment of the specific vinyl resins given by way of illustration in the foregoing examples, since, to the best of my knowledge and belief, any thermoplastic vinyl resin which in its dry state normally accumulates or tends to accumulate static charges of electricity is amenable to treatment with a guanidine salt (or mixture of guanidine salts) of the kind embraced by Formula I to obviate or minimize the accumulation of static charges of electricity thereon. Numerous examples of such vinyl resins have been given hereinbefore.

As has been indicated in a portion of this specification prior to the examples, the preferred vinyl resin which is subjected to treatment in accordance with this invention is polymeric acrylonitrile or copolymeric acrylonitrile containing in its molecules a substantial amount of combined acrylonitrile. Of such copolymeric acrylonitriles, I prefer to treat an acrylonitrile copolymer containing in the polymer molecules an average of at least about 85% by weight of combined acrylonitrile. In such copolymeric polymerization products, the proportions of monomers in the polymerizable mixture from which the copolymers are made preferably are adjusted so that the final copolymer contains in the molecules thereof an average of at least about 85% by weight of acrylonitrile (combined acrylonitrile). The expression "acrylonitrile polymerization product containing in the molecules thereof an average of at least about 85% by weight of combined acrylonitrile," as used herein and in certain of the appended claims, means a polymerization product (polymer, copolymer or interpolymer or mixture thereof) containing in its molecules an average of at least about 85% by weight of the acrylonitrile unit, which is considered to be present in the individual polymer molecule as the group

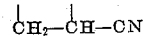

or, otherwise stated, at least about 85% by weight of the reactant substance converted into and forming the polymerization product is acrylonitrile (combined acrylonitrile). Examples of monomers which may be employed in the preparation of such copolymers of acrylonitrile have been given hereinbefore.

The use of guanidine salts of the kind embraced by Formula I in the treatment of thermoplastic vinyl resins to obviate or lessen the tendency of such resins to accumulate charges of electricity thereon has numerous advantages, among which may be mentioned their relatively lower cost as compared with others which have been suggested for this same general purpose; their ease of application (e. g., as aqueous dispersions); the fact that they do not form insoluble compounds in dispersions in hard water; their effectiveness both as anti-static agents and in lubricating and softening the shaped article in yarn or other form, whereby the treated yarn, film or other article is rendered more amenable to further processing or fabricating (e. g., weaving, knitting, etc., in the case of yarns); their compatibility with other conditioning agents commonly employed in finishing compositions used in treating fibers and other shaped articles formed of or containing a vinyl resin; their ease of removal from the treated article, when such removal appears to be desirable for subsequent processing or use of the article; their non-harmful effect upon the thermoplastic vinyl resin which is subjected to treatment; as well as other advantages.

The term "yarn" as used generically herein and in the appended claims includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein and in the appended claims includes within its meaning both monofilaments and multifilaments.

I claim:

1. A textile-treating agent comprising an aqueous dispersion of (1) a guanidine salt of a mono-alkyl ester of sulfuric acid, the alkyl grouping of which contains from 12 to 18 carbon atoms, inclusive, and (2) a textile lubricant consisting of a lower alkyl ester of a long-chain fatty acid that contains from 12 to 18 carbon atoms, inclusive, said ester containing from 2 to 5 carbon atoms, inclusive, in the alkyl grouping thereof.

2. A textile-treating agent especially adapted for conditioning yarns comprising a thermoplastic vinyl resin to lessen their tendency to accumulate static charges of electricity thereon, said agent comprising an aqueous dispersion of guanidine octadecyl hydrogen sulfate and butyl stearate.

3. The method of conditioning a shaped article comprising a thermoplastic vinyl resin to lessen its tendency to accumulate static charges of electricity thereon, said method comprising applying to the said article a conditioning composition comprising an aqueous solution of a guanidine salt of a mono-aliphatic hydrocarbon ester of sulfuric acid represented by the formula

where R represents an aliphatic hydrocarbon radical containing from 12 to 18 carbon atoms, inclusive, and drying the thusly treated article, said guanidine salt imparting anti-static characteristics to the said article.

4. A method as in claim 3 wherein the thermoplastic vinyl resin contains in its molecules a substantial amount of combined acrylonitrile.

5. A method as in claim 3 wherein the shaped article is in the form of a film.

6. A method as in claim 3 wherein the shaped article is in the form of a fiber.

7. A method as in claim 3 wherein the guanidine salt is a guanidine salt of a mono-alkyl ester of sulfuric acid, the alkyl grouping of which contains from 12 to 18 carbon atoms, inclusive.

8. A method as in claim 7 wherein the guanidine salt comprises guanidine octadecyl hydrogen sulfate.

9. The method of conditioning a yarn comprising fibers of a thermoplastic product of polymerization of a polymerizable mass comprising a preponderant proportion by weight of acrylonitrile to lessen its tendency to accumulate static charges of electricity thereon, said method comprising applying to the said yarn a conditioning composition comprising an aqueous solution of from about 0.5% to about 5% by weight thereof of a guanidine salt of a mono-alkyl ester of sulfuric acid represented by the formula

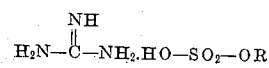

where R represents an alkyl grouping containing from 12 to 18 carbon atoms, inclusive, and drying the thusly treated yarn, said guanidine salt imparting anti-static characteristics to the said yarn.

10. The method of treating fibers of a thermoplastic product of polymerization of a polymerizable mass comprising at least about 85% by weight of acrylonitrile to impart anti-static characteristics thereto, said method comprising applying to the said fibers a conditioning composition comprising an aqueous solution of from about 0.5% to about 5% by weight thereof of an anti-static agent comprising guanidine octadecyl hydrogen sulfate, and drying the thusly treated fibers, said guanidine octadecyl hydrogen sulfate imparting anti-static characteristics to the said fibers.

11. The method which comprises applying a liquid conditioning composition to a fiber in gel state and in which the solid phase comprises an acrylonitrile polymerization product containing in the molecules thereof an average of at least about 85% by weight of combined acrylonitrile, said conditioning composition comprising an aqueous solution of a guanidine salt of a mono-alkyl ester of sulfuric acid represented by the formula

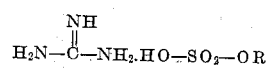

where R represents an alkyl grouping containing from 12 to 18 carbon atoms, inclusive, and drying the thusly treated, gelled fiber, the said guanidine salt imparting anti-static characteristics to the said fiber during and after drying thereof.

12. A shaped article comprising a thermoplastic vinyl resin which in a dry state normally has a tendency to accumulate static charges of electricity thereon, said article having deposited at least on outer surfaces thereof a guanidine salt of a mono-aliphatic hydrocarbon ester of sulfuric acid represented by the formula

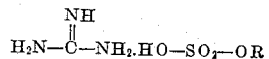

where R represents an aliphatic hydrocarbon grouping containing from 12 to 18 carbon atoms, inclusive, said guanidine salt lessening the tendency of the said article to accumulate static charges of electricity thereon.

13. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having been treated with an anti-static agent comprising a guanidine salt of a mono-alkyl ester of sulfuric acid represented by the formula

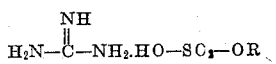

where R represents an alkyl grouping containing from 12 to 18 carbon atoms, inclusive, said guanidine salt imparting anti-static characteristics to the said textile.

14. Textile fibers formed of an acrylonitrile polymerization product containing in the molecules thereof an average of at least about 85% by weight of combined acrylonitrile, said fibers having deposited at least on outer surfaces thereof a conditioning agent comprising guanidine octadecyl hydrogen sulfate, said guanidine octadecyl hydrogen sulfate lessening the tendency of the said fibers to accumulate static charges of electricity thereon.

ARTHUR CRESSWELL.

REFERENCES CITED

The following references are of record in the file of this patent:

UNITED STATES PATENTS

| Number | Name | Date |
|---|---|---|
| 2,079,788 | Chambers | May 11, 1937 |
| 2,176,402 | Koch | Oct. 17, 1939 |
| 2,286,364 | Jayne et al. | June 16, 1942 |
| 2,320,225 | Ericks | May 25, 1943 |
| 2,403,960 | Stoops et al. | July 16, 1946 |
| 2,427,242 | Vitalis et al. | Sept. 9, 1947 |
| 2,464,247 | Mackay | Mar. 15, 1949 |

FOREIGN PATENTS

| Number | Country | Date |
|---|---|---|
| 421,862 | Great Britain | Jan. 1, 1935 |